July 5, 1938. E. S. SEGARD 2,122,701
TRANSMISSION
Filed June 24, 1936 6 Sheets-Sheet 3

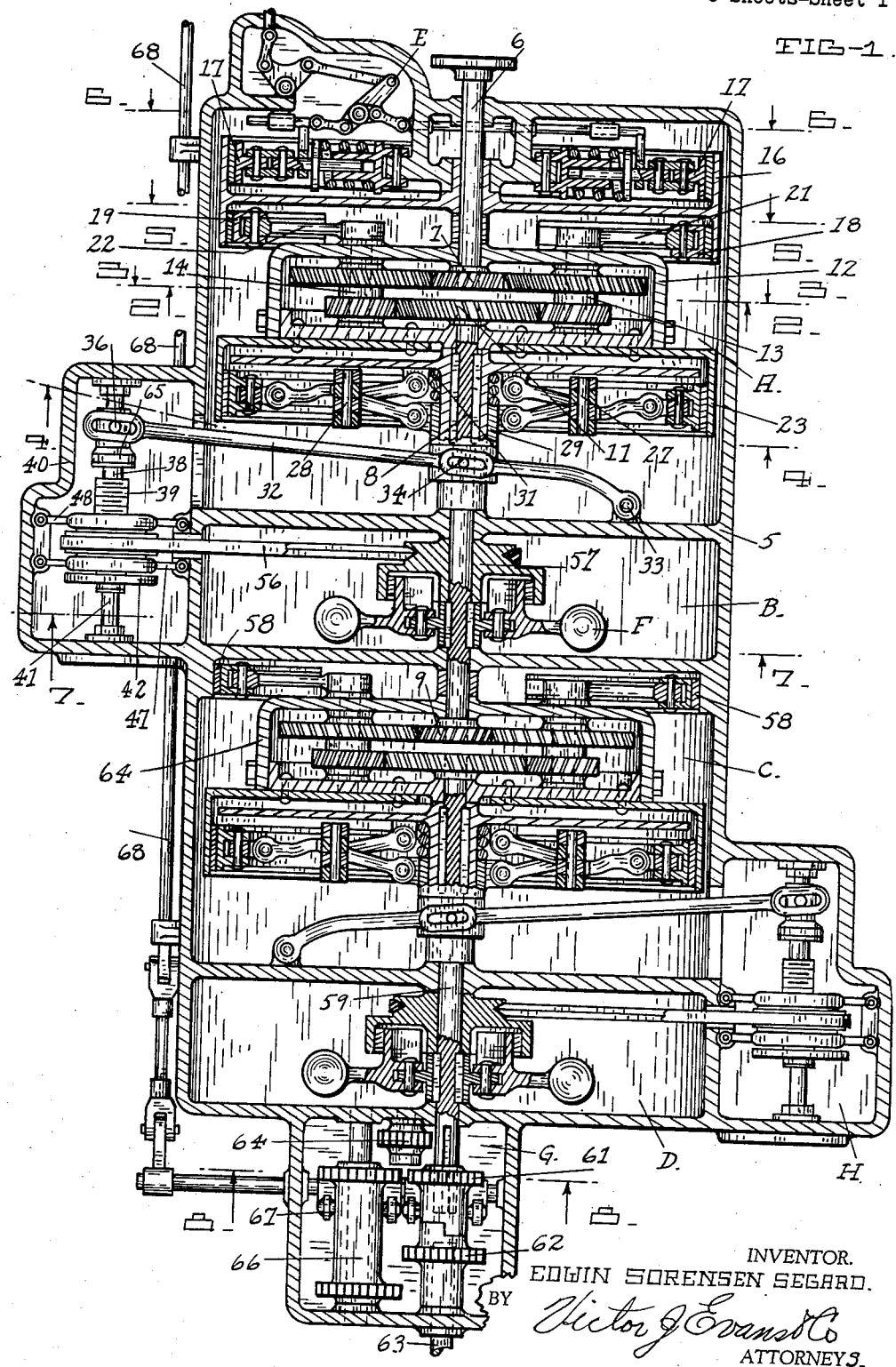

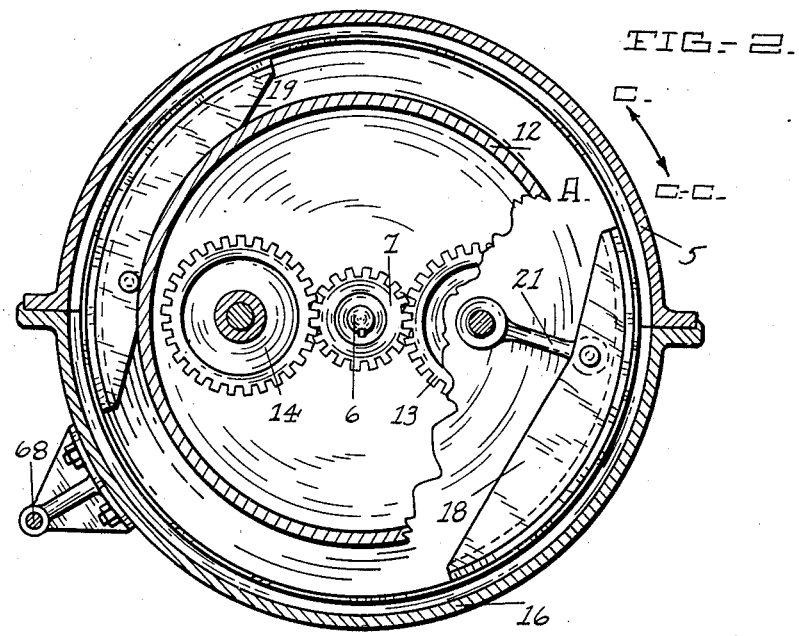
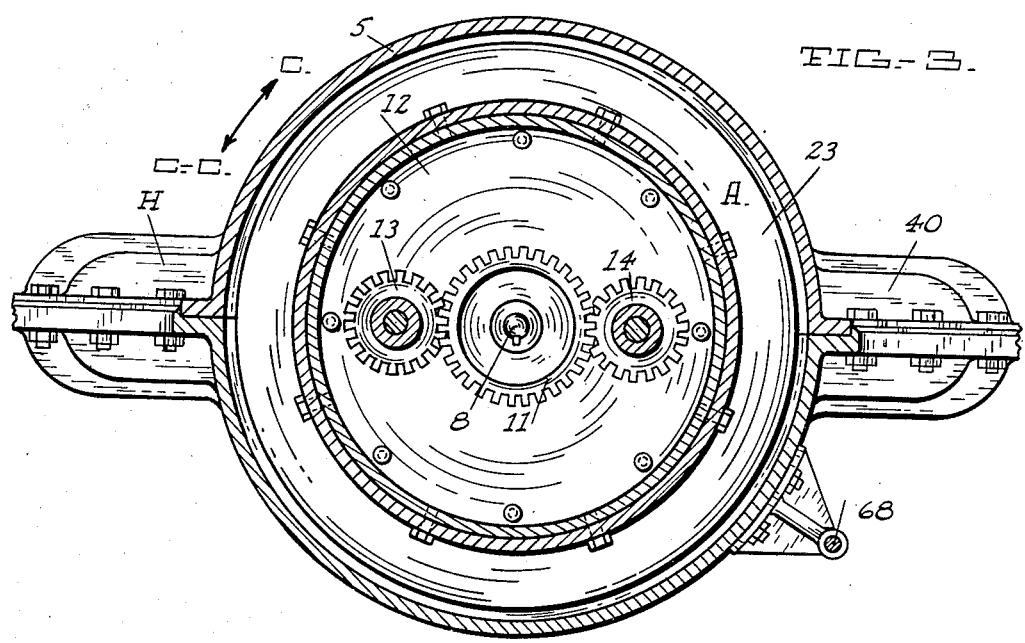

INVENTOR.
EDWIN SORENSEN SEGARD
BY
ATTORNEYS.

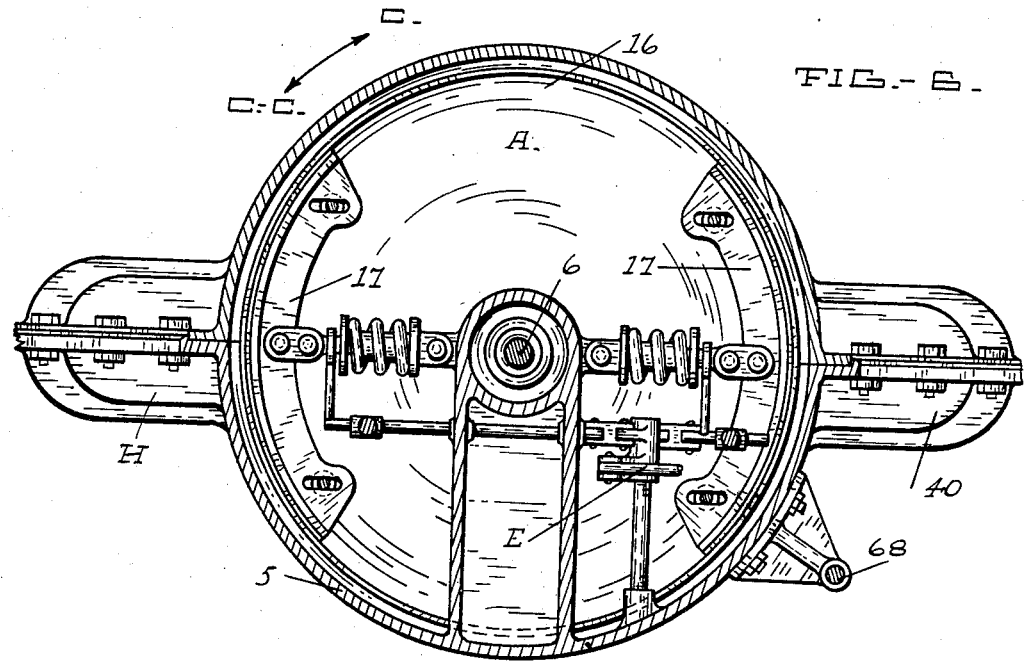
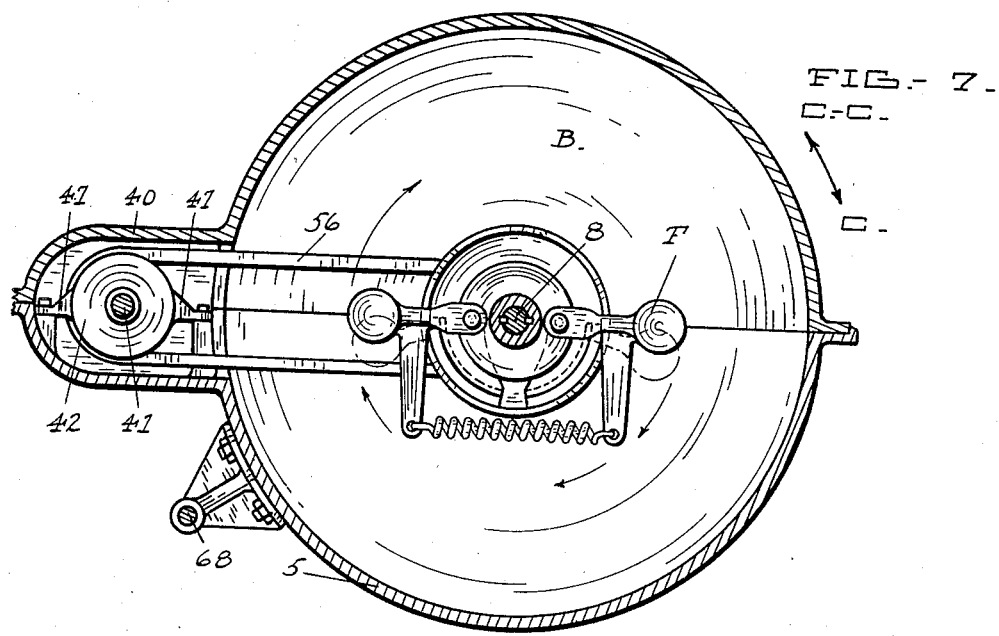

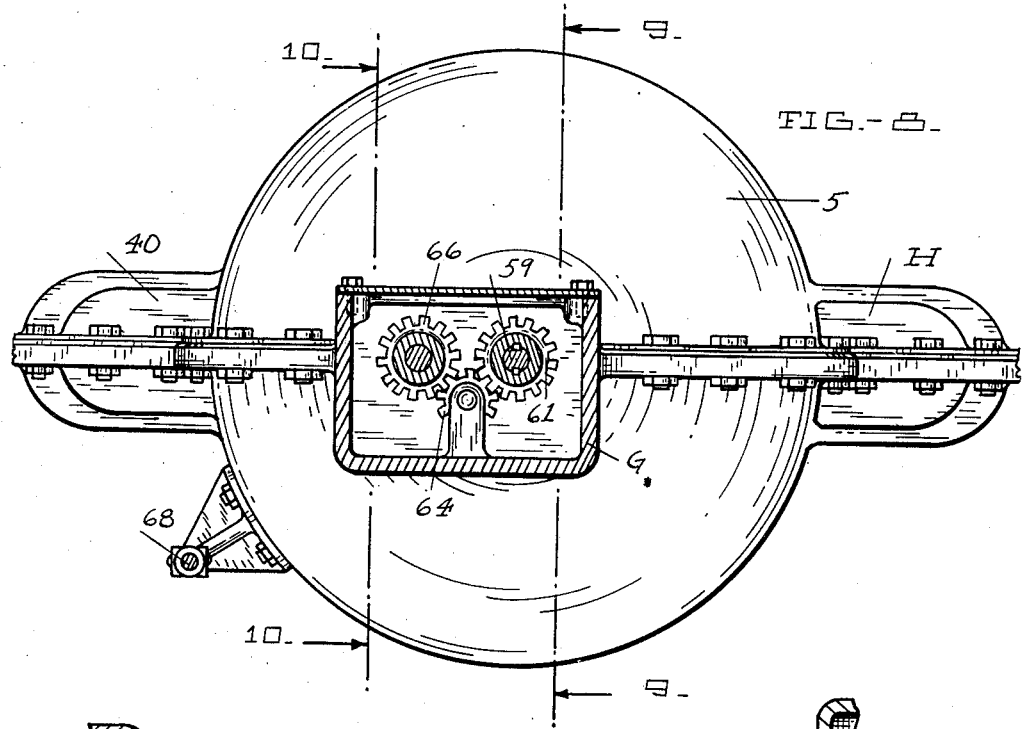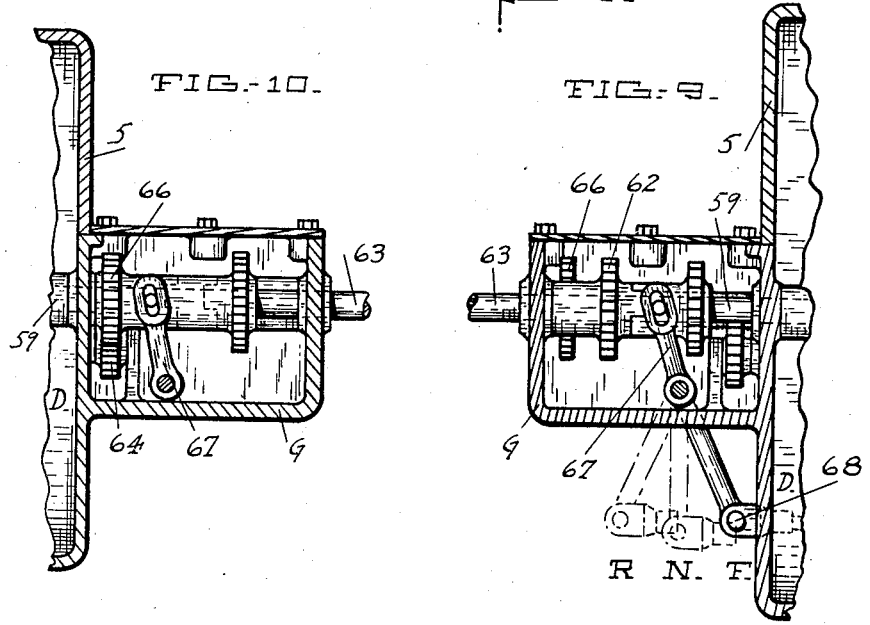

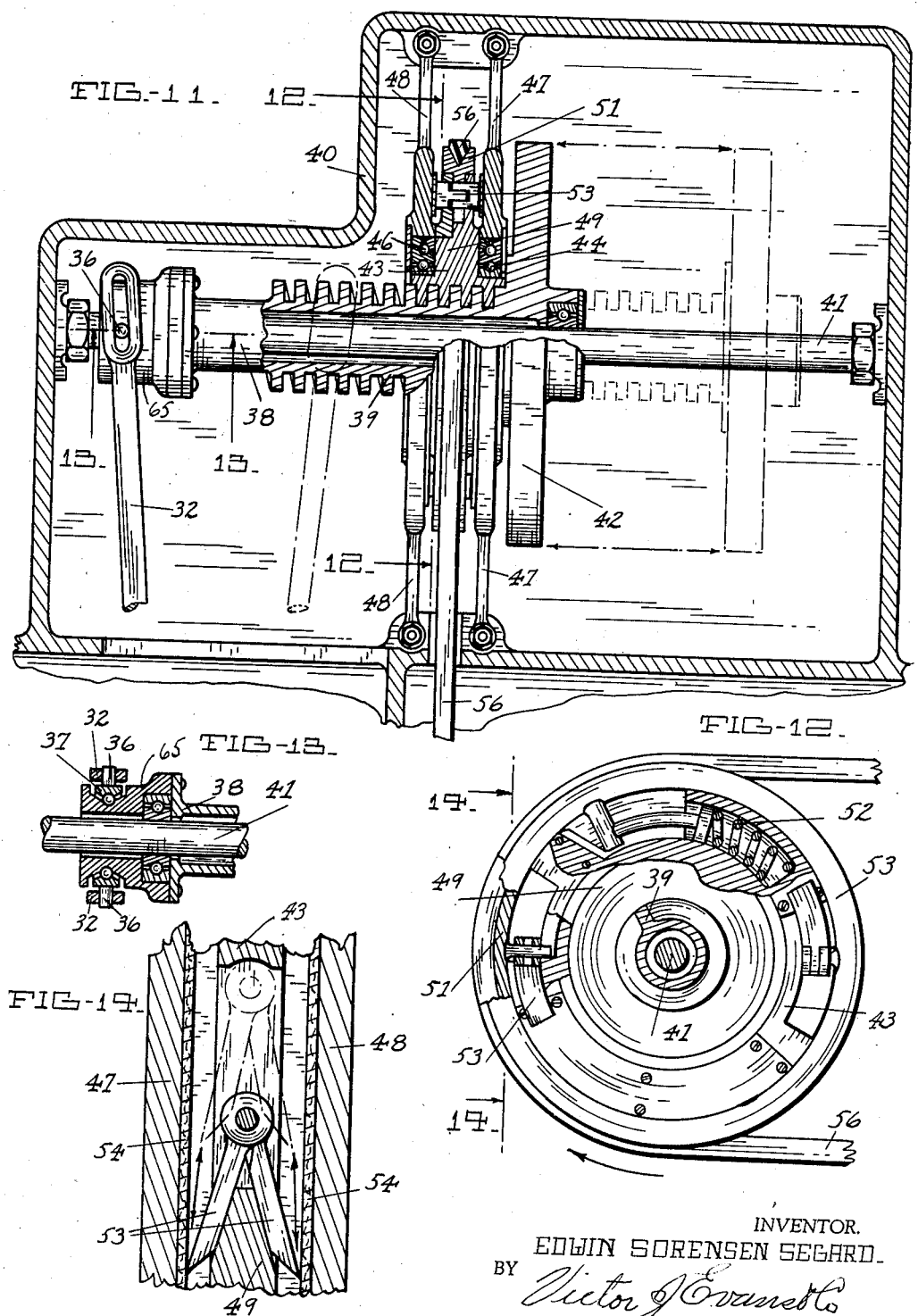

Patented July 5, 1938

2,122,701

UNITED STATES PATENT OFFICE 2,122,701

TRANSMISSION

Edwin S. Segard, San Francisco, Calif.

Application June 24, 1936, Serial No. 87,105

2 Claims. (Cl. 74—260)

This invention relates to improvements in transmissions and has particular reference to an automatic type of transmission wherein the load and torque automatically adjust the gears so that the proper ratio exists.

A further object is to produce a device of this character which may be applied to an ordinary automobile without materially altering its construction.

A further object is to produce a device of this character which is economical to manufacture and a device which employs well known mechanical principles which have been proven.

Other objects and advantages will be apparent during the course of the following description.

In the accompanying drawings forming a part of this specification and in which like numerals are employed to designate like parts throughout the same, Fig. 1 is a top plan view of my device, showing portions thereof in cross section;

Fig. 2 is a cross sectional view taken on the line 2—2 of Fig. 1, and showing the initial driving gears;

Fig. 3 is a cross sectional view taken on the line 3—3 of Fig. 1, looking in the direction of the arrows, and showing the secondary gear arrangement;

Fig. 6 is a cross sectional view taken on the line 6—6 of Fig. 1, looking in the direction of the arrows, and showing the main clutch mechanism;

Fig. 7 is a cross sectional view taken on the line 7—7 of Fig. 1, and showing the speed changing mechanism and ball governor therefor;

Fig. 8 is a cross sectional view taken on the line 8—8 of Fig. 1, looking in the direction of the arrows, and showing the reverse gear mechanism;

Fig. 9 is a longitudinal view taken on the line 9—9 of Fig. 8, and showing the reverse gear in the position it would assume when the transmission is in forward driving position;

Fig. 10 is a longitudinal view taken on the line 10—10 of Fig. 8, looking in the direction of the arrows, and showing the reverse gear mechanism in reversing position;

Fig. 11 is an enlarged fragmentary detailed view of the speed changing mechanism, looking from the bottom thereof;

Fig. 12 is a cross sectional view taken on the line 12—12 of Fig. 11, showing the screw wheel mechanism;

Fig. 13 is a fragmentary detailed view, showing the bearing for the travelling screw; and Fig. 14 is an enlarged detailed fragmentary view taken on the line 14—14 of Fig. 12, showing the manner in which the braking mechanism operates.

It has been common practice for years to employ gear changing mechanisms on motor vehicles, the purpose of which is to compensate for varying changes in road conditions or various speeds of the engine. This changing of the gears or speeds has been effected by employing friction drives and the intermeshing of various size gears, as well as other mechanisms. These devices all require manual effort; and due to certain mechanical difficulties, it has often been impossible to effect the change of the gears, particularly from high ratio to low ratio; and many accidents have occurred due to the inability of the operator to again mesh the gears after they have once been disengaged.

It is, therefore, my object to produce a transmission which may be connected between a driving unit and a driven unit, such as the wheels of a vehicle, so that a constant gear connection will exist at all times between the driven unit and the driving unit. This I accomplish by employing constantly meshed gears and a plurality of clutching mechanisms which automatically shift up or down the scale, as the case may be, so as to automatically change the gear ratio to accommodate for the load; and this I accomplish in a novel manner.

Figure 4:
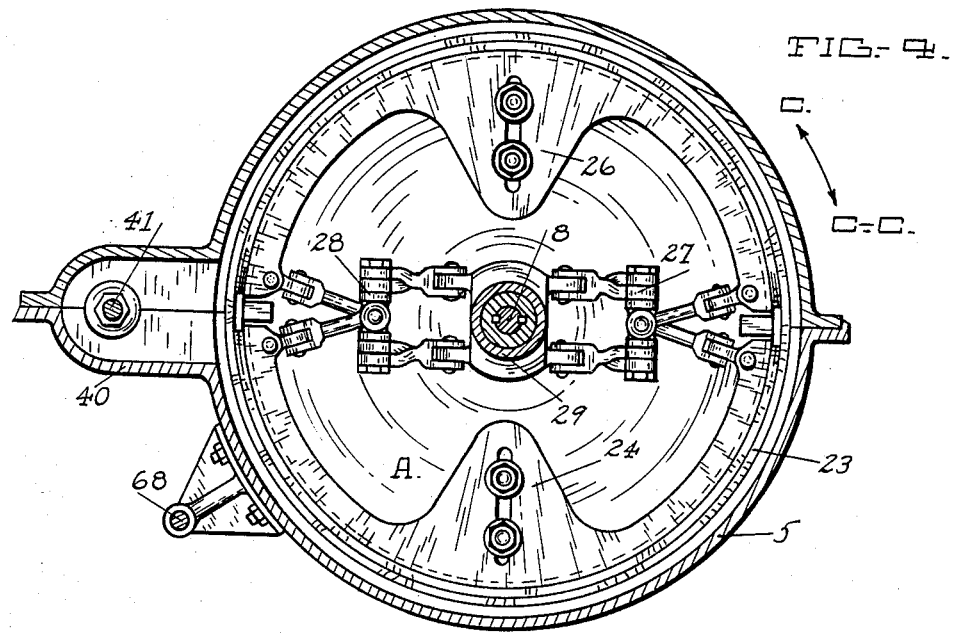
Fig. 4 is a cross sectional view taken on the line 4—4 of Fig. 1, looking in the direction of the arrows in Fig. 1, and showing the gear case clutch.
Figure 5:
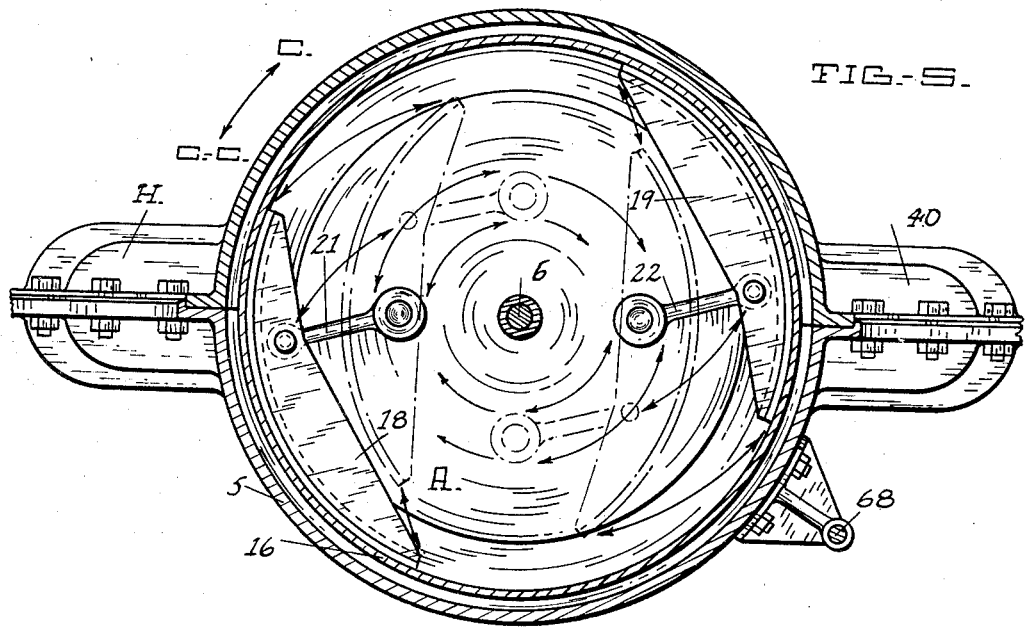
Fig. 5 is a cross sectional view taken on the line 5—5 of Fig. 1, and showing the retrograde movement clutch.

In the accompanying drawings wherein for the purpose of illustration is shown a preferred embodiment of my invention, the numeral 5 designates a casing which is divided into sections A, B, C, and D. Section A has a driven shaft 6, which is connected to a driving unit, such as an engine, and has a gear 7 connected thereto. Mounted in axial alignment with the shaft 6 is an intermediate shaft 8 which extends through the compartment B and into the compartment C and is provided with a gear 9, corresponding to the gear 7. Upon the opposite end of the shaft 8 is a gear 11 of larger diameter than the gear 7. Connecting the gears 7 and 11 are a pair of dumb-bell gears rotatably mounted in a gear casing 12 and bearing the numerals 13 and 14. These dumb-bell gears are of the customary construction—that is, one large gear and one small gear connected together. The large gear meshes with the gear 7, and the small gear meshes with the gear 11. This construction is common and needs no further comment. Rotatably mounted on the shaft 6 is a drum 16. Within the forward portion of the drum is positioned the main clutch, consisting of a pair of shoes 17 which are retracted by a foot pedal operating through a suitable linkage, designated as a whole by the letter E. As this linkage is merely a mechanical movement to effect the action of the clutch, further comment thereon is unnecessary. Mounted in the rear portion of the drum 16 is a retrograde clutch having brake shoes 18 and 19, which shoes are connected by connecting rods 21 and 22 respectively to the gear casing 12. Secured to the gear casing 12 and upon the opposite side from the connecting rods 21 and 22 is a drum 23 in which is positioned the gear changing clutch comprising a pair of expanding shoes 24 and 26, as shown in Fig. 4, which are actuated by a toggle mechanism, designated as a whole by the numerals 27 and 28. This toggle mechanism is in turn operated by a sliding collar 29 and normally held rearwardly by a spring 31. It will be apparent by viewing Fig. 1 that when the collar 29 is moved toward the right of the drawing, the links attached to the collar will move toward the links to which they are pivoted, and, consequently, the common pivotal point will move outwardly, pushing the brake shoes 24 and 26 against their brake drum. In order to actuate this collar and consequently the toggle mechanism, I employ a lever 32, pivoted as at 33, to the casing 5; and I employ a pin and slot connection 34 with the collar 29. This lever 32 extends through the casing 5 and engages a pin 36 upon a thrust collar 37, connected to a quill 38 which is provided with a worm thread 39. This quill has ball bearings at both ends thereof and is freely slidable on a stationary shaft 41, mounted in the casing 40. The quill also carries a relatively heavy fly wheel 42, the purpose of which will be later seen. Mounted on the quill is a screw wheel 43 which is held in fixed position against lateral movement with respect to the casing 40 by bearings 44 and 46, which bearings are supported by tie rods 47 and 48 respectively. This screw wheel consists of a hub portion 49 and a floating rim 51. A spring 52 tends to force the parts in opposite directions. Carried by the rim are two pairs of dogs 53 which are normally in the position shown in dotted lines in Fig. 14 when the screw wheel is being driven. However, as soon as the screw wheel ceases to be driven, the action of the spring 52 is such that the movement of the rim about the hub will cause a wedged portion of the hub to spread these dogs and force them out against a friction surface 54, carried upon the tie rods 47 and 48. In order to rotate the screw wheel, I employ a belt 56, which passes over a grooved pulley 57, mounted upon the shaft 8. This pulley has a clutching surface which may be engaged by a pair of centrifugally actuated clutch surfaces of a type such as shown in Fig. 7 and designated as a whole by the letter F. This governor arrangement is located in the compartment B. The mechanism located in compartment C is identical with that located in compartment A, with the exception that the main clutch is eliminated and, therefore, the retrograde clutch 58 of this compartment acts directly againts the casing 5. The mechanism in compartment D is identical with the mechanism in compartment B; and the mechanism for changing speeds is identical with that described in the casing 40. The shaft 59, which corresponds to the shaft 8, extends through the rear of the casing 5 and into the compartment G and has splined thereto a gear 61, provided with a jaw clutch which engages a similar jaw clutch formed upon the gear 62. This gear is fastened to a propeller shaft 63; and when in the position of Fig. 1, direct drive is effected. Mounted in compartment G is an idler gear 64 and a slidable dumb-bell gear 66. A lever arrangement, designated as a whole by the numeral 67, is so arranged that when the pull rod 68 is actuated, the gear 61 and the dumb-bell gear 66 will be moved into proper relation with the idler gear 64 to cause a reverse movement of the propeller shaft 63. When the pull rod 68 is moved half of its travel, the gear 61 and the gear 66 are moved into neutral position, as indicated in the N position of Fig. 9.

*Operation of the parts*

Assuming that the parts are to be arranged as shown in Fig. 1 and installed in a vehicle; then if the linkage E is operated in such a manner that shoes 17—17 are disengaged from the drum 16; and if toggles 27 and 28 in compartments A and C are in position of release, power applied to shaft 6 will rotate the gear 7, which will rotate gears 13 and 14, causing them to exert counter-clockwise force on casing 12, causing it to rotate counter-clockwise, carrying with it connecting rods 21 and 22 with their attached shoes 18 and 19, which shoes carry along the drum 16. All these parts then rotate counter-clockwise in unison at a speed in inverse ratio to the speed of the shaft 6 in proportion to the ratio between the gear 7 and gears 13 and 14 meshing with the gear 7, which rotation takes place about gear 11, which remains at rest. Assume now that linkage E be so operated, that shoes 17—17 expand against the forward inner surface of the drum 16; immediately drum 16 is brought to rest relative to casing 5. At once the retrograde clutch shoes 18 and 19, acting against the rear inner surface of the drum 16, stop all counter-clockwise rotation of casing 12, which action causes dumb-bell gears 13 and 14 to transmit power to gear 11, thus causing the shaft 8 to revolve clockwise. This rotation, when increased enough, will cause the ball governor F to commence to operate, engaging the flange of the pulley 57, thus driving the belt 56 and the screw wheel rim 51. (See Fig. 12.) This power applied to the rim will compress the spring 52, driving the hub 49, and at the same time, retracting the dogs 53, so that the screw wheel will run freely between the tie rods 47 and 48. Therefore, the quill and its fly wheel will move laterally along the shaft 51 because the inertia of the fly wheel will keep the quill from rotating. This movement along the shaft will cause the pins 36 to move the end of the lever 32, which is attached to the collar 65 on the end of the quill, which movement of the lever will move pins 34 and collar 29, which will actuate the toggles 27 and 28, causing clutching of the drum 23. The pressure on pins 36 will cause back pressure on the thread 39 against the threads of the screw wheel 43; and as this increases, the inertia of the fly wheel will be overcome, causing fly wheel, quill, and screw wheel to rotate as one. As soon as the clutching of the gear changing clutch actuated by toggles 27 and 28 has been completed, the drum 23 and casing 12 and its contents will start to rotate about the axis of the shaft 8 in unison with the shaft 8, causing the shoes 18 and 19 to release from the drum 16, which remains at rest and fixed to the casing 5. The gear 9 on the shaft 8 is now delivering power to the gears with which it is meshed; and on further increase in rotation rate, the operation of the mechanisms in compartments C and D and H are identical with these just described for compartments A and B and in casing 40, except that the shoes 58—58 are released from casing 5, whereas shoes 18 and 19 release the drum 16.

In slowing down, the ball governor F releases its hold on pulley 57, which removes the driving force on belt 56 and on the rim of the screw wheel 43, which causes the spring 52 to apply braking dogs 53, stopping the screw wheel 43 from rotation, which stoppage of rotation of screw wheel 43 allows the inertia of the now rotating fly wheel 42 on the quill 38 to draw the quill 38 back through the screw wheel 43 to the position of release of the lever 32 and its attached clutch members.

*Method of operation of the transmission when installed in a motor driven vehicle*

Assuming that the motor of the car in which this transmission is installed is started while the gears in compartment G are in neutral position and that the main clutch shoes 17—17 controlled by linkage E are in position of engagement or operating position holding drum 16 at rest fixed to the casing 5, at once shaft 6 begins to rotate clockwise, which rotation transmitted to gear 7 causes power to be applied to the gears in casing 12, which power is transmitted to the gear 11 because casing 12 is held at rest by shoes 18 and 19 acting on the rear surface of the drum 16. The power applied to the gear 11 causes the shaft 8 to rotate clockwise, transmitting power to the gear 9, which causes the shaft 59 to rotate clockwise because shoes 58 hold casing 64 at rest in casing 5. Shaft 59 is now rotating clockwise in inverse ratio to shaft 6 in accordance with the sum of the gear ratios in casing 12 and casing 64.

Assuming now that the clutch pedal controlling linkage E and the main clutch is depressed, releasing the main clutch shoes 17—17, at once the drum 16 becomes free to rotate counter-clockwise; and as a result, the power applied in clockwise direction on gear 7 by the shaft 6 will go through gears 13 and 14 in casing 12 and exert force on casing 12 in a counter-clockwise direction, causing casing 12 with its contents (except gear 11) and its attached connecting rods 21 and 22, and shoes 18 and 19, and drum 16 to rotate counter-clockwise at a speed in inverse ratio to the speed of the shaft 6 in accordance with the gear ratio in casing 12. As a result of this counter-clockwise rotation of casing 12, gear 11, shaft 8, and the mechanisms in compartment B, gears in gear casing 64, and shaft 59 are deprived of power and slow down and come to rest. As soon as they begin to slow down, pull rod 68 is pulled to the point where the gears in compartment G lock in forward position. The conditions now obtained are comparable to those in a conventional car in low gear with clutch disengaged and engine running, except that the engine is here dissipated by counter-clockwise rotation of casing 12 instead of severance of the gear connections.

Assuming that at this time pressure on the clutch pedal is removed and linkage E is operated thereby to the position of engagement of the shoes 17—17 of the main clutch, at once drum 16 is slowed up and brought to a stop from its counter-clockwise rotation. This causes shoes 18 and 19 to stop casing 12 and its contents from counter-clockwise rotation, which stoppage causes the rotation of shaft 6 to be transmitted through the gears 13 and 14 and to the gear 11, which rotates shaft 8, which shaft rotates the gear 9 in gear casing 64; the gear 9 in this casing causes rotation of shaft 59 in exactly the same manner as described above for the gear 7, causing rotation of shaft 8 because the gear casing 64 is prevented from counter-clockwise rotation by shoes 58 acting on the inside of the casing 5. With the foregoing conditions, the assumed car is travelling forward in low gear, which low gear is the sum of the gear ratio in casings 12 and 64.

Assuming now that the revolutions per minute of the shaft 6 are increased sufficiently to cause the revolutions of the shaft 8 to actuate the governor mechanism F, grasping the pulley 57, thereby applying rotation power through the belt 56 to the screw wheel rim 51, causing compression of the spring 52, thereby releasing the brake dogs 53, setting in motion the screw wheel 43, which operating on the threads of the quill 38, causes the quill 38 to move through the screw wheel 43, due to the inertia of the fly wheel 42 attached to the quill 38, which movement causes pressure on the pin 36 to operate the lever 32, thereby actuating the clutch toggle mechanism 27 and 28, which actuation causes the clutch shoes 24 and 26 to grasp the drum 23, which grasping at once causes the locking of the casing 12 to the shaft 8, which locking at once releases the retrograde clutch shoes 18 and 19; and now shaft 6, casing 12, and shaft 8 all rotate in unison, which condition together with that already described as obtained in compartment C, constitutes intermediate conventional gear, and the assumed car is now travelling forward in conventional intermediate gear. Further increase in the speed of the shaft 6 to the point where its revolutions per minute increase the revolutions per minute of the shaft 59 to the point where the ball governor in compartment D engages the belt pulley in compartment D causes the belt in compartment D to rotate the screw wheel in compartment H, which functions in the same manner as the mechanism described above in obtaining the intermediate gear situation, which function consists of applying the toggle clutch in compartment C, causing the gear casing 64 to rotate in unison with the shaft 59, thus releasing the retrograde clutch mechanism in compartment C in exactly the same manner as described as happening in compartment A in obtaining intermediate gear. Now shaft 6, shaft 8, shaft 59, and shaft 63 all rotate in unison, and the assumed car is travelling with its motor and propeller shaft 63 in a one to one ratio, which is identical with conventional high gear.

Assume now that the car is slowed down. This will cause the ball governor in compartment D to disengage, which disengagement will cause the mechanism in compartment H to release the toggle clutch mechanism in compartment C in the reverse order of that described above. The car is now back in intermediate gear. Further slowing down of the car causes the ball governor in compartment B to release, which release causes the mechanism in casing 40 to release the toggle clutch in compartment A. The car is now back in low gear.

*Method of operation in reverse*

Assume that the gears in compartment G are in neutral position with the motor running, the clutch pedal depressed holding the main clutch in disengagement. Pull rod 68 is moved until the gears in compartment G are in the position of reverse. Release of pressure on the clutch pedal enables power of the motor to inaugurate in reverse all of the changes just described above for forward or in other words, in reverse, three speeds are available.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. In an automatic transmission gear mechanism comprising a casing, a plurality of shafts extending through said casing, said shafts being in axial alignment one with the other, gear casings surrounding the abutting ends of said shafts, gears mounted in said casings, means for locking said casings against movement to effect a gear ratio between said shafts, clutch means for independently releasing said gear casings at predetermined speeds, a governor controlled mechanism for effecting said last mentioned means, said governor comprising a shaft, a threaded quill rotatably and slidably mounted on said shaft, a fly wheel secured to said quill, a screw wheel engaging said thread, a lever actuated by the movement of said quill on said shaft, said lever actuating said clutch mechanism, and means for rotating said screw wheel.

2. In an automatic transmission gear mechanism comprising a casing, a plurality of shafts extending through said casing, said shafts being in axial alignment one with the other, gear casings surrounding the abutting ends of said shafts, gears mounted in said casings, means for locking said casings against movement to effect a gear ratio between said shafts, clutch means for independently releasing said gear casings at predetermined speeds, a governor controlled mechanism for effecting said last-mentioned means, said governor comprising a shaft, a threaded quill rotatably and slidably mounted on said shaft, a fly wheel secured to said quill, a screw wheel engaging said thread, a lever actuated by the movement of said quill on said shaft, said lever actuating said clutch mechanism, means for rotating said screw wheel, said means including a flexible connection between said governor and said quill, and a clutch interposed between said flexible means and said quill.

EDWIN S. SEGARD.